United States Patent
Vollmer et al.

(10) Patent No.: US 6,873,889 B2
(45) Date of Patent: Mar. 29, 2005

(54) METHOD FOR INTEGRATING A DEVICE INTO A VEHICLE COMMUNICATIONS NETWORK

(75) Inventors: Vasco Vollmer, Gartow (DE); Matthias Hofmann, Freital (DE)

(73) Assignee: Robert Bosch GmbH, Stuttgart (DE)

( * ) Notice: Subject to any disclaimer, the term of this patent is extended or adjusted under 35 U.S.C. 154(b) by 163 days.

(21) Appl. No.: 10/276,507

(22) PCT Filed: Mar. 30, 2001

(86) PCT No.: PCT/DE01/01267

§ 371 (c)(1),
(2), (4) Date: Nov. 15, 2002

(87) PCT Pub. No.: WO01/89151

PCT Pub. Date: Nov. 22, 2001

(65) Prior Publication Data

US 2004/0015272 A1 Jan. 22, 2004

(30) Foreign Application Priority Data

May 16, 2000 (DE) ........................................ 100 23 703

(51) Int. Cl.⁷ .............................................. G06F 19/00
(52) U.S. Cl. ....................................... 701/36; 307/10.1
(58) Field of Search ....................... 701/1, 36; 307/9.1, 307/10.1

(56) References Cited

U.S. PATENT DOCUMENTS 5,794,164 A * 8/1998 Beckert et al. ............ 455/3.06
6,160,796 A * 12/2000 Zou ........................... 370/257
6,263,269 B1 * 7/2001 Dannenberg ................. 701/29
6,292,718 B2 * 9/2001 Staiger .......................... 701/1
6,525,432 B2 * 2/2003 Heckmann et al. ........ 307/10.1
2003/0078699 A1 * 4/2003 Harms et al. .................. 701/1
2003/0120396 A1 * 6/2003 Vollmer et al. ................ 701/1
2003/0171852 A1 * 9/2003 Vollmer et al. ................ 701/1
2004/0039505 A1 * 2/2004 Vollmer et al. .............. 701/36
2004/0054445 A1 * 3/2004 Vollmer et al. ................ 701/1

FOREIGN PATENT DOCUMENTS

EP         0 929 170        7/1999
EP         0 986 216        3/2000

* cited by examiner

*Primary Examiner*—Gary Chin
(74) *Attorney, Agent, or Firm*—Kenyon & Kenyon

(57) ABSTRACT

A method of adding a device to a vehicle communications network. The method is used to announce a device added to the vehicle communications network to the other devices already connected to the vehicle communications network and to make the newly added device controllable for other devices via a driver. Either a default driver or a special driver is used, the special driver being loaded from the device itself or via a telecommunications network or by the user. The device recognized is entered into a database together with the particular driver. The newly added device is recognized either by a message from the newly added device to the bus manager or by an initialization phase triggered by the newly added device. If the database for entries is exhausted, the entries for devices not connected to the vehicle communications network for the longest period of time are deleted. A bus according to IEEE 1394 may be used as the vehicle communications network.

17 Claims, 1 Drawing Sheet

METHOD FOR INTEGRATING A DEVICE INTO A VEHICLE COMMUNICATIONS NETWORK

FIELD OF THE INVENTION

The present invention relates to a method of adding a device in a vehicle communications network.

BACKGROUND INFORMATION

Vehicle communications networks may be used to an increased extent in motor vehicles to interlink multimedia components. Such a vehicle communications network may be, for example, the MOST bus over which data may be exchanged among the multimedia components via optical cables. Such multimedia components may include, for example, a radio receiver, a CD player and a navigation unit. A bus manager may perform the administrative functions of the vehicle communications network, including recognition of new devices, for example. The devices of the vehicle communications network may be placed in various locations in the vehicle.

SUMMARY OF THE INVENTION

An exemplary method according to the present invention for adding a device in a vehicle communications network may provide that an added device may be recognized; that it may be determined whether there is a special driver for the new device; and if this is not the case, such a driver may be requested. The device recognized may be entered into the database of the vehicle communications network, and the other devices of the vehicle communications network may be notified that the new device has been added to the vehicle communications network. This may yield systematic handling of a newly added device. Therefore, the other devices may be also notified automatically that this device is also available, if required, for control with its functions.

The new device may log on with the bus manager and may thus be recognized as a new device by the bus manager. This may initiate the phase of identification of the new device, so that the connection of the new device to the vehicle communications network may then be made known to all the other connected devices, and the functions of the new device may be made available to the other devices.

The new device may trigger an initialization phase of the vehicle communications network, so that all the devices which are then connected to the vehicle communications network may then be recognized by the bus manager.

The special driver may also be supplied along with the new device to be added, i.e., the driver may be stored on the new device and may be loaded over the communications network. This may simplify the acquisition of the special driver for the new device to be added.

The special driver may be requested by the user of the vehicle communications network. The user may be notified, via an arrangement for visual and acoustic display, which special driver is available and how it is to be loaded. This special driver for the new device to be added may be loaded via a memory, such as, for example a CD-ROM inserted by the user into a storage device of the vehicle communications network.

The special driver for the new device to be added may be loaded via a telecommunications network, e.g., the Internet, directly from the manufacturer's Internet website. This may yield an arrangement of acquiring the special driver which is shielded from the user. This may be a simple and convenient method.

Entries may also be reserved in the database for such devices which have already been removed from the vehicle communications network until the point in time when the database is exhausted. Then the first entries deleted may be the ones entered for those devices which have not been connected to the vehicle communications network for the longest period of time. By marking the entries, however, certain entries may be blocked to prevent deletion in order to continue to keep these entries available.

A default driver for the newly added device may be used if no special driver is available immediately. With such default drivers, a basic function of a newly added device may be implemented, thus permitting a use of the new device. However, special functions characteristic of this device may then be not possible with the default driver.

A bus system according to IEEE 1394 may be used as the vehicle communications network. This may be a serial bus in which terminals are connected via a copper cable having four to six strands or via an optical fiber. Various communications network topologies may be implementable by using this bus system.

The added device may have an arrangement for implementing the steps of the exemplary method according to the present invention. A device may have a bus manager which performs the steps of the exemplary method according to the present invention.

DETAILED DESCRIPTION

Vehicle communications networks may be used to an increasing extent in motor vehicles. The devices connected to the vehicle communications network may not always be present immediately with the original equipment, in particular devices which do not come onto the market until after the original equipment of the vehicle. Later, users may add new devices to the vehicle communications network as desired and as may be required.

Therefore, an exemplary method of adding a device in an automotive communication network may be used according to the present invention. A bus manager may determine on the basis of a database of the vehicle communications network whether a special driver, which may make all the functions of the new device usable, or a default driver is available for a device recognized as new. If only the default driver is available, the special driver for the newly recognized device may be requested, and an entry for the newly recognized device may be made in the database. The other devices of the vehicle communications network may be notified of the presence of the newly added device. The special driver may either be loaded by the newly added device itself or a user may be instructed to load the special driver by using an interchangeable memory medium, or the special driver may be loaded from an external database via an interface via an external telecommunications network.

The entries for the devices in the database of the vehicle communications network may be linked to the available drivers. This link may either be the direct storage of the drivers or reference to the driver, i.e., where the driver is stored and thus may be loadable.

Figure 1:
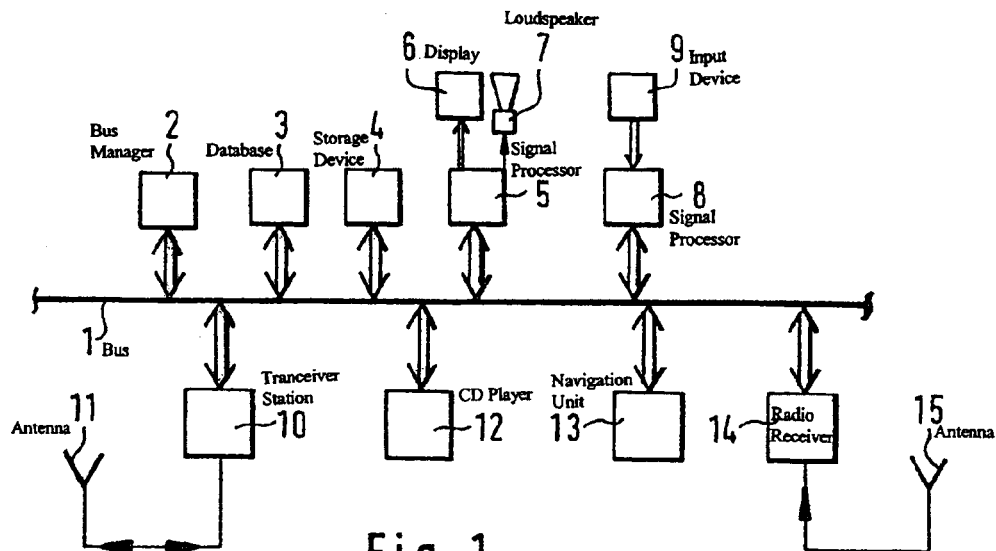
FIG. 1 shows a configuration of a vehicle communications network.

FIG. 1 shows the configuration of a vehicle communications network. A bus manager 2, a database 3, a memory 4, a signal processor 5, a signal processor 8, a transceiver station 10, a CD player 12, a navigation unit 13 and a radio receiver 14 are connected to a bus 1 via data inputs/outputs. All the devices connected to bus 1 have bus controllers which permit communication over bus 1. A display 6 is connected to a first data output of signal processor 5. A loudspeaker 7 having an audio amplifier is connected to a second data output of signal processor 5. An input device 9 is connected to a data input of signal processor 8. An antenna 11 is connected to a second data input/output of transceiver station 10. An antenna 15 is connected to an input of receiver 14.

Bus 1 here is a bus system according to IEEE 1394, called a firewall. However, other bus systems may also be used here. Bus manager 2 here runs on a separate device having a processor, and other applications may also be stored on this device and called up. Storage device 4 is a device to hold interchangeable storage media, e.g., a CD-ROM drive or a DVD drive, or a traditional disk drive. As an alternative, a storage device having a fixedly installed storage device medium or combinations of a fixedly installed storage device with a drive for interchangeable storage devices, may also be used.

Display 6 here is a plasma display screen, and input device 9 has manual operating elements, menus that may be displayed on display 6 being selectable. Voice control may also be provided. If equipped with a touch-sensitive layer, display 6 may also function as an input device 9.

Transceiver station 10 and antenna 11 form a mobile telephone, which may establish a dial-up connection to a public telecommunications network. In particular, connection to the Internet may be provided, so that drivers may also be downloaded from Internet websites. Navigation unit 13 has a locating device, to ascertain the location of bus 1. Radio receiver 14 has a high-frequency receiving part which filters the radio signals received via antenna 15, amplifies them and converts them to an intermediate frequency. In addition, radio receiver 14 has an analog-digital converter to convert the received radio signals into digital signals. Demodulation and decoding are also performed in radio receiver 14. The data thus received is transmitted over bus 1 to signal processor 5, to then be output via loudspeaker 7 or, in the case of multimedia data, also via display 6.

Figure 2:
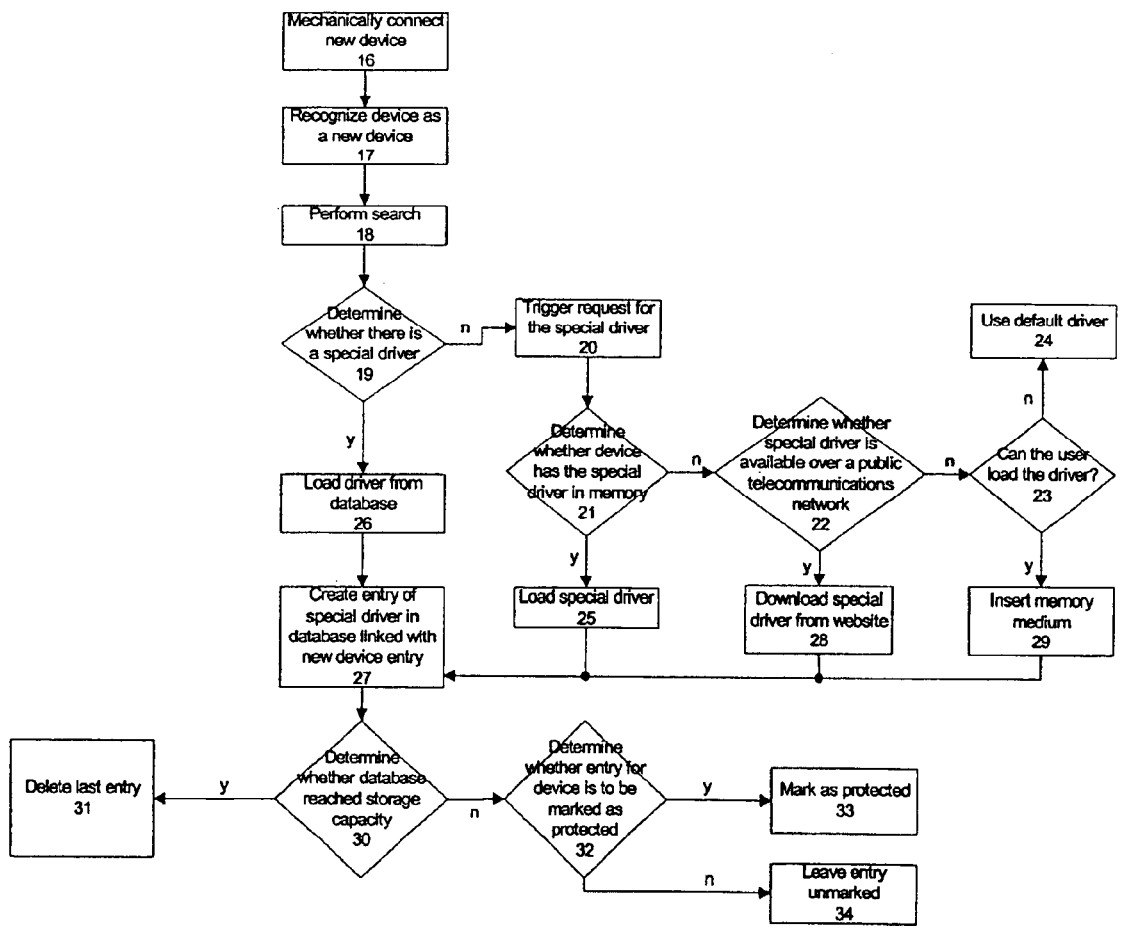
FIG. 2 shows a flow chart of the exemplary method according to the present invention.

FIG. 2 shows the exemplary method according to the present invention in the form of a flow chart. In method step 16, the new device to be added, a CD player 12 here, is mechanically connected to vehicle communications network 1. Vehicle communications network 1 has interfaces as bus 1 to which new devices may be connectable. The vehicle communications network may also be expandable. The new devices may be required to have the proper bus controllers for this purpose.

Then in method step 17, CD player 12 is recognized as a new device by bus manager 2. The new device is recognized here by the feature that CD player 12 sends a message to bus manager 2 over bus 1 indicating that it is logging on as a new device. As an alternative, the new device, CD player 12, may log on by triggering an initialization phase for vehicle communications network 1. This initialization phase may include the feature that all devices connected to vehicle communications network 1 are recognized by bus manager 2 so they are then entered into database 3.

In method step 18, bus manager 2 then performs a search on the basis of the entries in database 3 to determine whether there is already a special driver for CD player 12 as a newly added device. This is then checked in method step 19. The special driver may allow for all functionalities of CD player 12 to be executable. For example, signal processor 8 then loads the special driver for CD player 12, to then trigger the corresponding actions on CD player 12 on the basis of input by the user via input device 9.

If it is found in method step 19 that the special driver for CD player 12 is not present, then in method step 20, bus manager 2 triggers a request for the special driver. For this purpose, in step 21 a check is performed to determine whether CD player 12 itself has the special driver in a memory. If this is the case, then in method step 25 the special driver is loaded from CD player 12 and entered into database 3. Then the special driver for the devices that wish to control CD player 12 is available. This entry is made in method step 27.

If it is found in method step 21 that the special driver is not available on CD player 12, then a check is performed in method step 22 to determine whether the special driver is available over the public telecommunications network. To do so, a dial-up connection to a server is established via the mobile telephone, which includes transceiver station 10 and antenna 11, to establish a connection to the Internet. Then an Internet website which may have the special driver is sought. This information regarding which Internet website is to be selected is reported by CD player 12 to bus manager 2, or a search engine is used to locate the proper websites having the drivers. If this is the case, then in method step 28, the special driver is downloaded from the Internet website. Then in method step 27 the entry with the special driver is made in database 3.

However, if it is found in method step 22 that the special driver is not available over the Internet, which may also be the case, for example, if it is not known how the special driver is to be downloaded from the Internet, then in method step 23, the user is instructed to load the driver via storage device 4. If the user is able to do so, then in method step 29, on instruction via display 6 and/or loudspeaker 7, a memory medium is inserted into storage device 4 so that the special driver may then be loaded. Method step 29 is then followed by method step 27 again, to perform the entry with the special driver in database 3.

However, if it is not possible for the user to load the special driver himself in method step 23, then in method step 24 a default driver from the database is used to control CD player 12. The user makes this known by making corresponding entries via input device 9. Then later a renewed attempt is made to load a special driver. This is done here so that after certain intervals in time, a request is issued to the user to load the special driver. This may also be done, for example, when the user is using vehicle communications network 1, i.e., after starting the vehicle.

If it is found in method step 19 that the special driver for CD player 12 is already present in database 3, then in method step 26 the driver is loaded from the database and then linked in method step 27 with the new entry for CD player 12.

In method step 30, a check is performed to determine whether database 3 has reached its storage capacity. If this is the case, then in method step 31, the last entry is deleted, i.e., the entry made for a device not connected to the vehicle communications network for the longest period of time. In addition, the entry for the newly added device is marked, if required, so that this entry is preserved from deletion. This is followed by normal operation of the vehicle communications network.

If it is found in method step 30 that the capacity of the database is not exhausted, then in method step 32, a check is performed to determine whether the entry for CD player 12 having the special driver is to be marked as protected. Thus, the entry for CD player 12 will not be deleted when the storage capacity of database 3 is exhausted. If this is the case, then in method step 33, the entry is marked as protected; if this is not the case, then in method step 34 the entry is not marked and normal operation of the vehicle communications network continues.

As an alternative, the exemplary method according to the present invention may not use all the method steps presented above to load the special driver. If, for example, a vehicle does not have a transceiver station, so it is unable to download the special driver from the Internet, then it is up to the user and/or the newly added device to load the special driver.

A device of vehicle communications network 1 may be configured so that it has the bus manager, i.e., a required processor and a storage device to hold the software of the bus manager. The newly added devices may be configured so that, when they are connected to vehicle communications network 1, they automatically send a message to bus manager 2 to identify themselves. As an alternative, newly added devices may be configured so that, when they are connected to vehicle communications network 1, they automatically trigger an initialization phase which may result in recognition of the new device.

What is claimed is:

1. A method of adding a new device to a vehicle communications network, other devices being connected to the vehicle communications network at different locations in a vehicle, the method comprising:

adding the new device to the vehicle communications network;

configuring a bus manager to recognize the new device that has been added, and to determine based on a database whether there is one of a special driver and a default driver for the new device;

requesting the special driver for the new device that has been recognized, if there is only the default driver for the new device;

entering the new device into the database; and notifying the other devices of the vehicle communications network that the new device has been added to the vehicle communications network.

2. The method of claim 1, wherein the new device that has been added is recognized through a message from the new device to the bus manager.

3. The method of claim 1, wherein the new device that has been added is recognized by the bus manager based on an initialization phase of the vehicle communications network, the initialization phase being triggered when the new device is added.

4. The method of claim 2, further comprising:

configuring the new device to load the special driver.

5. The method of claim 2, wherein the special driver is requested, using at least one of a visual output and an acoustic output of a first device of the vehicle communications network, and the method further comprises:

loading the special driver via an interchangeable storage device of a second device of the vehicle communications network.

6. The method of claim 2 further comprising:

downloading the special driver by the bus manager via a telecommunications network connectable to the vehicle communications network.

7. The method of claim 1, further comprising:

keeping entries for removed devices that have been removed from the vehicle communications network in the database together with particular special drivers, until a capacity of the database is exhausted; and deleting the entries for unconnected devices that have not been connected to the vehicle communications network for a longest period of time.

8. The method of claim 7, further comprising:

marking preselected entries for the devices to prevent deletion from the database.

9. The method of claim 1, further comprising:

using the default driver for the new device that has been added until the special driver is loaded.

10. The method of claim 1, wherein a bus according to IEEE 1394 is used as the vehicle communications network.

11. The method of claim 1, further comprising:

linking the database entry of the new device with a database entry of the one of the special driver and the default driver.

12. The method of claim 6, wherein the new device reports to the bus manager a website location from which to download the special driver.

13. The method of claim 6, wherein a website location from which to download the special driver is located via a search engine.

14. The method of claim 9, wherein the request for the special driver is repeatedly made until the special driver is loaded.

15. The method of claim 14, wherein the request is repeated at least one of after predetermined time intervals and after a vehicle start.

16. An arrangement for a vehicle communications network having different locations in a vehicle for connecting devices, comprising:

a new device configured to be added to the vehicle communications network and to be one of recognized by a bus manager and capable of sending a message to the bus manager so that the new device is recognized, the new device further configured to be entered into a database, wherein, according to the database, a determination is made by the bus manager whether there is one of a special driver and a default driver for the new device, the special driver being requested for the new device by the bus manager if there is only the default driver for the new device, and other devices of the vehicle communications network being notified by the bus manager that the new device has been added to the vehicle communications network.

17. An arrangement for adding a new device to a vehicle communications network, other devices being connected to the vehicle communications network at different locations in a vehicle, comprising:

a bus manager to recognize the new device that has been added, and to determine based on a database whether there is one of a special driver and a default driver for the new device, and to request the special driver for the new device if there is only the default driver for the new device, and to enter the new device into the database, and to notify the other devices of the vehicle communications network that the new device has been added to the vehicle communications network.

* * * * *